(12) United States Patent
Schulte et al.

(10) Patent No.: US 8,627,607 B2
(45) Date of Patent: Jan. 14, 2014

(54) SLIDING WINDOW GUIDE FOR A SLIDING WINDOW COMPONENT COMPRISING NON-PARALLEL GUIDES

(75) Inventors: Martin Schulte, Balve (DE); Jürgen Kraus, Balve (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 60 days.

(21) Appl. No.: 13/115,215

(22) Filed: May 25, 2011

(65) Prior Publication Data

US 2011/0289732 A1 Dec. 1, 2011

(30) Foreign Application Priority Data

May 28, 2010 (EP) ..................................... 10164269

(51) Int. Cl.
*E05D 13/00* (2006.01)
(52) U.S. Cl.
USPC .................................. 49/452; 49/504; 49/505
(58) Field of Classification Search
USPC ........... 49/452, 440, 441, 504, 505, 414, 415, 49/453; 16/193
See application file for complete search history.

(56) References Cited

U.S. PATENT DOCUMENTS

| | | | | | |
|---|---|---|---|---|---|
| 3,557,499 | A | * | 1/1971 | Dickie | 52/36.4 |
| 4,910,917 | A | * | 3/1990 | Brauer | 49/348 |
| 5,673,515 | A | * | 10/1997 | Weber et al. | 49/352 |
| 6,131,340 | A | * | 10/2000 | Clark et al. | 49/410 |
| 6,427,286 | B1 | * | 8/2002 | Erskine | 16/96 R |
| 2012/0167469 | A1 | * | 7/2012 | Maltaverne et al. | 49/360 |

FOREIGN PATENT DOCUMENTS

| | | | |
|---|---|---|---|
| DE | 103 31 269 A1 | | 1/2005 |
| DE | 10331269 A1 | * | 1/2005 |
| DE | 10 2004 061 567 B3 | | 9/2006 |
| EP | 0 857 844 B1 | | 12/2002 |
| EP | 1 747 927 A2 | | 1/2007 |
| EP | 1747927 A2 | * | 1/2007 |
| FR | 2 829 971 A1 | | 3/2003 |
| FR | 2829971 A1 | * | 3/2003 |

OTHER PUBLICATIONS

European Search Report, Application No. 10164269.2, Aug. 4, 2010, 7 pgs.
EPO English translation of FR 2 829 971 obtained online on Jan. 15, 2013, 5 pgs.

* cited by examiner

*Primary Examiner* — Katherine Mitchell
*Assistant Examiner* — Scott Denion
(74) *Attorney, Agent, or Firm* — Paul D. Strain, Esq.; Strain & Strain PLLC

(57) ABSTRACT

Nonparallel sliding window guides guide a window for a motor vehicle. Each guide may have a guide rail. At least one guide has a fixed holding device mounted to the pane. At least one guide is attached to a holding device, in which the guide is movably mounted using an equalizing bearing. The equalization bearing comprises at least one movable interlink, preferably a pivotally movable interlink, wherein the interlink connects the guide rail to the holding device in a stabilizing manner to accommodate transverse and/or torsion forces that may act on the guide rail. The interlink engages with the guide via a control groove and control bolt. The distance between at least one guide and the sliding window changes depending on the displacement of the sliding window. The position of at least one guide relative to the mount also changes depending on the displacement of the sliding window.

13 Claims, 3 Drawing Sheets

SLIDING WINDOW GUIDE FOR A SLIDING WINDOW COMPONENT COMPRISING NON-PARALLEL GUIDES

CROSS-REFERENCE TO RELATED PATENT APPLICATIONS

This application is based upon and claims the benefit of priority from prior European Patent Application No. 10164269.2, filed May 28, 2010, the entire contents of which are incorporated herein by reference in their entirety

BACKGROUND OF THE INVENTION

The invention relates to a sliding window guide for a sliding window component for a motor vehicle, in particular for a passenger vehicle, comprising non-parallel guides, comprising a guide rail and a holding device to which the guide rail is movably connected via an equalizing bearing such that the equalizing bearing is capable of equalizing a displacement of the guide rail, which occurs in response to the shifting of the sliding window.

Sliding windows comprising non-parallel guide rails of this type are known from patent DE 10 2004 061 567 B3, which was granted for the applicant. The guide rails encompass an equalizing device in the form of a construction, which is embodied in multiple parts, in the case of which a movable guide rail is pivotably supported on a guide holder and is placed against the edge of the sliding window via a resilient first equalizing element, which acts between guide rail and guide holder. Provision is furthermore made for a second equalizing element, which ensures the engagement of the guide elements, which are provided on the sliding window, with the guide groove of the guide rail despite the distance between guide rail and the outer edge of the sliding window, which changes across the displacement path.

Sliding window components comprising non-parallel guide rails are to be used, in particular when those openings in the body of a vehicle, in which the sliding window component is to be accommodated, encompasses upper and lower limitations, which run in a non-parallel manner. In the event that the guide rails nonetheless run parallel in such a case in the case of a sliding window component, the distance thereof and thus also the height of the sliding window must always be oriented on the smallest distance between upper and lower limitation. This opposes the attempt to always attain the maximally possible see-through surface with a window. In addition, the guide rails and the auto body lines, which are visible on the vehicle exterior or vehicle interior and which help shape the optical impression of the vehicle to quite a considerable extent, would furthermore not run parallel or at least not in an optically pleasing manner to the guide rails in such a case. This would lead to a line layout comprising body edges and visible edges, which diverge. This also applies in particular to the black print, which is typically located on the inside of the pane and which is visible from the inside and the outside and which follows the outer contour of the window and of the auto body, and by means of which adhesive seams, for example, are optically covered.

SUMMARY OF PREFERRED EMBODIMENTS

It is the object of the invention to improve the interaction of guide rail and guide holder beyond the extent described in DE 10 2004 061 567 B3. In particular the support of the guide rail, which is movably held in the holding device, is to be improved in view of the stability of the construction, inter alia with the goal of counteracting rattling noises, which can be created by means of the drive-dynamic effects, such as natural frequency excitation or unsteady wind forces.

The manner in which movable and stationary components interact in consideration of production-orientated points of view and of assembly aspects are to be improved in a specific manner. The production of the individual components is to thereby be possible with the use of standard methods.

It is to furthermore be ensured that the sliding window is held securely in the guide rail and that the guide rail is held securely and free from play in the holding device, if possible, and that the components, which are movable relative to one another, interact in a robust manner for the entire operation period.

In addition, an embodiment is to be found, in the case of which the potential danger of foreign particles penetrating between the individual components and jamming them so as to be a hindrance to the function, is minimized despite the components, which move relative to one another in the manner of scissors.

For the solution, the invention provides for the equalization bearing to comprise at least one movable interlink, in particular a pivotally movable interlink, which connects the guide rail to the holding device in a stabilizing manner such that it can effectively accommodate the transverse forces and/or torsion forces, which act on the guide rail.

By means of this embodiment, the interlink ensures that the degrees of freedom of the guide rail are limited in a stability-promoting manner except for the intentionally permitted displacement in response to the activation of the sliding window. The sliding window is thus securely guided in lateral direction even in response to occurring transverse forces and a rotation of the guide rail about is longitudinal axis, which can occur in response to an eccentrical force transmission, is prevented. Such an interlink can be produced in an advantageous manner in the required stability and dimensional accuracy as a simple sheet metal-shaped part made of metal.

The interlink is preferably embodied as a pivot handle, which is articulated on the holding device and the guide rail. It is further advantageous when the interlink is articulated on the holding device and the guide rail such that it is purely pivotable relative to one of the components, preferably relative to the holding device, and that it is pivotable and displaceable relative to the respective other component, thus preferably relative to the guide rail.

To control the pivoting movement of the interlink, which accompanies the displacement of the guide rail relative to the holding device, the interlink and the component, in contrast to which the interlink can be displaced in a pivotable manner, engage with one another via control means, in particular via a control groove and a control bolt. The term control bolt thereby comprises any type of bolts, pins, cams, domes or other projections, which are suitable to engage with a groove, thus with a component recess, which extends longitudinally, and to be guided therein. Through this, the maximal displacement of the guide rail relative to the holding device can be delimited effectively on the one hand, and the guide rail can be specifically placed against the holding device or against the sliding window on the other hand, by means of an elastic prestressing element, for example a spring, to support the displacement movement, for example, and/or to minimize a possibly available play to prevent an unintentional noise development. The prestressing element can act directly between guide rail and holding device and/or the prestress can be realized in that the prestressing element acts directly onto the interlink, so that the prestressing force is transferred via the interlink.

To provide for the threading of the control means into one another in response to the assembly, thus in particular in response to the threading of the control bolt into the control groove, provision is made for an assembly groove, which is transferred into the control groove. The assembly groove breaks through the outer contour of the component, in which it is provided, on the edge-side, so that it can be accessed from the outside. This embodiment simplifies the assembly of the component, because the interlink can thus be hooked into the control groove in a simple manner.

Preferably, the interlink is articulated on both sides on the guide rail, in particular on both sides of a guide groove, which is provided in the guide rail. It is furthermore advantageous when the interlink encompasses the guide rail on the outer side. Provision can be made for two similar interlinks, which are independent on one another. However, for reasons of stability, in particular to reach a high torsional stiffness of the component, it is advantageous when the interlink encompasses at least partially a U-shaped cross section, and that the two journals, which encompass the guide rail, one of which is in each case articulated on one of the two sides of the guide rail, are connected to one another via the U-shaped cross sectional course.

Furthermore, the U-shaped embodiment of the cross section of the interlink makes it possible for interlink, guide rail and holding device to be able to be placed inside one another in a space-saving and optically advantageous manner.

In the case of the embodiment of the sliding window guide, it must be considered that the guide rail may be displaced so far towards the holding device that a gap is created between holding device and guide rail in response to the displacement of the guide rail relative to the holding device, depending on the angular orientation of the guides relative to one another and depending on the displacement path of the sliding window. To keep foreign objects from entering into this gap, guide rail and holding device preferably engage with one another to the extent that the guide rail is partially covered by the holding device even in response to the maximal displacement of the guide rail relative to the holding device. The formation of a gap between these two components is thus prevented in a reliably manner.

This parameter can be realized in a particularly simple manner when the holding device encompasses the guide rail on the outer side, with reference to the vehicle towards the vehicle interior, by means of a profile journal in such a manner and when the guide rail still dips at least partially into the holding device even in response to a maximum degree of opening.

Provision can furthermore be made for the cross sections of the holding device and of the guide rail to be matched to one another at least in sections such that the guide rail, in the pivoted state, is held by the holding device so as to be free from play or that it is accommodated therein, respectively. This can be attained in that the holding device encompasses on the inner side a guide rail accommodation, which narrows in pivoting direction, and into which the guide rail dips in response to the pivoting process until the guide rail is in contact with the holding device via the guide rail accommodation.

For this purpose, the guide rail, on one or a plurality of suitable locations, encompasses an outer contour, which corresponds to the respective accommodation, so that guide rail and holding device are in point or line contact with one another in the area of the accommodation or abut on one another in a two-dimensional manner at least in the area of the accommodation. In the pivoted state, guide rail and holding device thus preferably come to abut on one another at least partially so as to be free from play, so that rattling noises caused by drive-dynamic effects and natural frequencies can be avoided. This can also be attained in that provision is made at the respective locations for rib-like projections, namely on the outer side of the guide rail and/or on the inner side of the holding device in the area of the accommodation, with said projections abutting on the respective other component in the pivoted state. In particular, this only partial abutment of the components on one another has the advantage that the total surface, with which the outer side of the guide rail and the inner side of the holding device abut on one another, is smaller and that a jamming of the guide rail in the holding device can thus be counteracted effectively.

In addition or as an alternative to a prestressing element, which acts on the interlink, a prestressing element, in particular a spring, can act directly between guide rail and holding device. The prestressing element thereby acts as pressure spring and thus ensures that the guide rail is placed against the sliding window and pivots outwardly in a defined manner. The guide elements, which are to be provided on the sliding window, can thus interact with the guide rail in a disturbance-free manner and so as to be free from play. The prestressing element is thereby preferably located in the central area of the guide rail.

Guide pins, which are accommodated in a piston-like manner in a sleeve, which is embedded in the movable disk or in a frame part, which is connected to the movable disk, on the edge side, and which are prestressed against the guide rail by means of a spring, can be considered as guide elements, which are to be provided on the sliding window. In response to the displacement of the sliding window, the guide elements can adapt to the changing distance between guide rail and sliding window edge in that the guide pin projects to a higher or lower extent, so that they always interact optimally with the guide rail.

The sliding window can either be activated manually in a common manner or it can be driven with an external power, in particular by means of an electric motor.

DESCRIPTION OF THE DRAWINGS

Further features and advantages of the invention result from the subclaims and from the following description of preferred exemplary embodiments by means of the drawings.

DETAILED DESCRIPTION OF PREFERRED EMBODIMENTS

Figure 1:
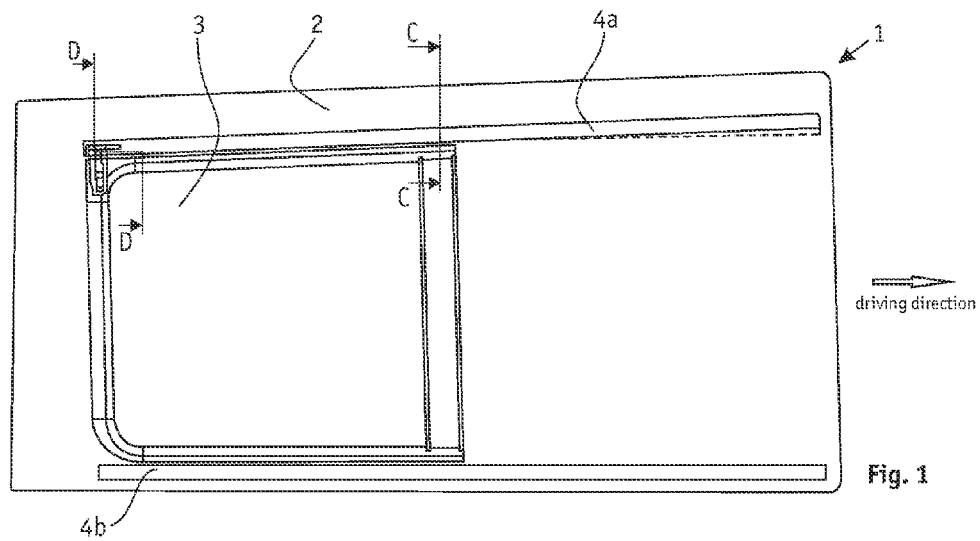
FIG. 1 shows a sliding window component comprising non-parallel guides with the sliding window in closed position.
Figure 2:
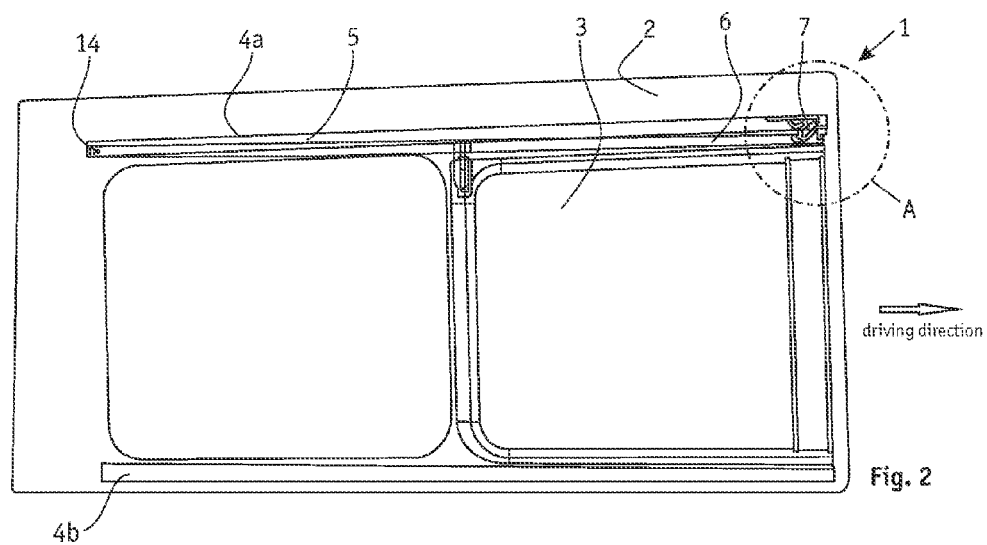
FIG. 2 shows the sliding window component from FIG. 1 with the sliding window in open position.

FIG. 1 and FIG. 2 illustrate a sliding window component 1, which comprises a stationary window pane 2 and a movable sliding window 3. The sliding window 3 is guided in an upper guide 4a and in a lower guide 4b, which do not run parallel to one another. In addition to a holding device 5, which is fixedly connected to the window pane 2, the upper guide 4a encompasses a guide rail 6, which is supported so as to be movable relative to the holding device 5 via an equalizing bearing.

In FIG. 1, the sliding window 3 is in closed position and in FIG. 2 in open position, in which it releases an opening in the window pane 2. The comparison of FIG. 1 and FIG. 2 shows that the distance of the upper sliding window edge relative to the holding device 5 of the upper guide 4a changes across the displacement path of the sliding window 3. The more the sliding window is opened, the greater this distance becomes. This change of distance is equalized in that the guide rail 6 of the upper guide 4a, which is supported so as to be pivotally movable relative to the holding device 5, pivots out of the holding device 5 in response to the displacement of the sliding window 3, is thus displaced relative to the holding device 5. However, the lower guide 4b of the sliding window 3 is embodied as a classic guide, as it is sufficiently known to the person of skill in the art.

The embodiment, which is shown in the figures in an exemplary manner, in the case of which the upper guide 4a equalizes the non-parallelism of the guide rails, is not absolutely necessary for the realization of the invention. It is likewise also possible that the lower guide 4b or even the lower and the upper guide are embodied to take over the equalizing function.

Insofar as reference is made below to "in the front" or "in the rear", respectively, or "front" or "rear" components, respectively, these terms refer to the driving direction indicated by the arrow in FIG. 1 and FIG. 2, and to the embodiment, which is illustrated therein in an exemplary manner, in the case of which the distance of the outer edges of the stationary window pane and the distance of the upper and lower guide expand in driving direction and in the case of which the sliding window must be displaced in driving direction, so as to be transferred from the closed into the open position. In view of the invention, it goes without saying that this is not to be considered as being limiting. The invention can just as well be realized in embodiments, which deviate from this.

In the case of sliding window components, as they are typically used, the distance between the lower guide 4b and the upper guide 4a is generally between approximately 400 mm and 500 mm, depending on the vehicle. In the case of non-parallelism of the guides and a typical opening angle of approximately 1.5° to 3° and a total length of the guides of approximately 1000 mm, the change of distance, which is to be equalized by means of a displacement of the guide rail, is approximately 13 mm to 26 mm, when assuming that the movable sliding window in closed position engages with the front guide elements approximately in the center of the guide.

In particular when the guide rail 6, which is preferably made of plastic, is pivoted out of the holding device 5 after the opening of the sliding window 3, the guide rail 6, which guides the sliding window 3, is to be connected to the vehicle in a manner, which is as stable and as robust as possible. Otherwise, there is a risk that the sliding window 3 is not sufficiently stable and is too movable due to the potentially occurring transverse forces at right angles to the stationary window pane 2. This gives an instable and thus qualitatively low quality impression and can negatively impact the disturbance-free function. The same applies analogously also to other forces, which act on the guide rail, which can lead to a twisting of the guide rail, for example.

Figure 3:
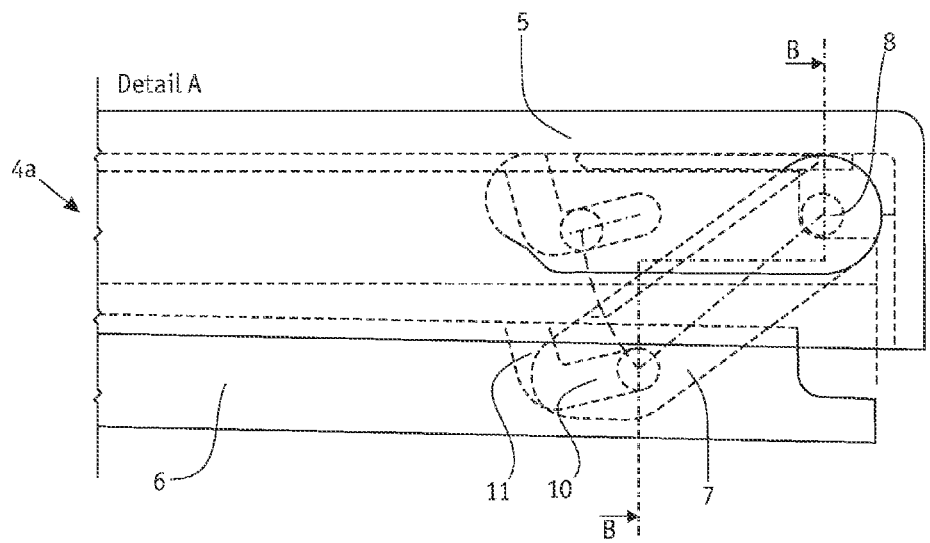
FIG. 3 shows the front area of the guide, which is illustrated in FIG. 1 and FIG. 2, in detail (detail A from FIG. 2)

To attain the desired stability, provision is made in the case of the upper guide 4a for a pivotally movable interlink, which can be seen from FIG. 2 and FIG. 3, via which the guide rail 6 and the holding device 5 are coupled to one another. The interlink is a pivot handle 7, which is pivotally supported on the holding device 5 by means of a support bolt 8. At the same time, the pivot handle 7 engages with a control groove 10, which is provided on the guide rail 6, via a control bolt 9 and can thus be pivoted as well as displaced relative to the guide rail.

FIG. 3 illustrates the position of the guide rail 6 and of the pivot handle 7 in open position of the sliding window by means of solid lines and the position of the guide rail 6 and of the pivot handle 7 in closed position of the sliding window by means of dotted lines.

In the event that the guide rail 6 is displaced relative to the holding device 5 as a result of an opening movement of the sliding window, the pivot handle 7 is pivoted about the support bolt axis and the control bolt 9 slides along in the control groove 10 until it stops at the groove end. This stop prevents a further displacement of the guide rail 6 and thus forms an effective limitation for the degree of opening.

To be able to insert the pivot handle 7, which is preferably produced as a torsion-resistant steel molded part, into the control groove 10 with its control bolt 9, which is arranged thereon, an assembly aid precedes the control groove 10. In FIG. 3, the assembly aid is formed in an exemplary manner by an assembly groove 11, which can be accessed on the edge side and via which the control bolt 9 can be transferred into the control groove 10. In the event that the sliding window is in closed position, the length of the control groove 10 ensures that the control bolt 8 cannot slide out of the control groove 10.

It can further be seen in FIG. 3 that the holding device 5 overlaps the guide rail 6 on the side thereof such that a gap between holding device 5 and guide rail 6, which can be accessed from the outside, is not formed, even when the maximum degree of opening has been reached. This particularly advantageous matching of the guide rail 6 and of the holding device 5 to one another is optional and is not illustrated in the remaining figures.

Figure 4:
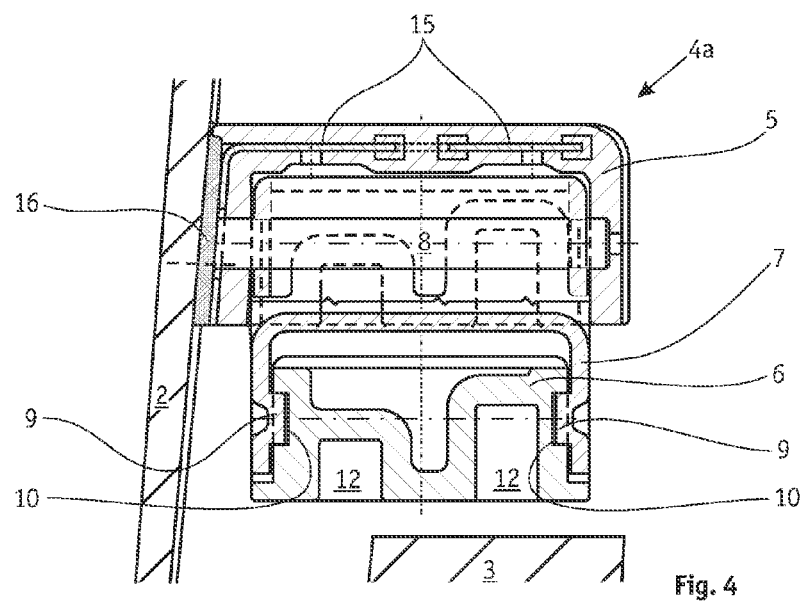
FIG. 4 shows the front area of the guide, which is illustrated in FIG. 1 to FIG. 3, in a sectional view (sectional view according to sectional line B-B from FIG. 3)

As can be seen from FIG. 4, which shows the sectional view along the sectional line B-B, which has been drawn in FIG. 3, the pivot handle 7 is embodied as a U-handle, encompasses the guide rail 6 on both sides of the guide grooves 12, which are provided in the guide rail 6, and is also engaged therewith on both sides of the guide rail 6 via control bolts 9 and control grooves 10. In addition, the pivot handle 7 abuts closely and free of play, as far as possible, on the inner side on the holding device 5, and is pierced by the support bolt 8 on the holding device for the purpose of a pivotal support. The U-shaped embodiment of the pivot handle 7 does not only make the pivot handle 7 as such to be particularly torsion-resistant, it furthermore provides for the coupling of guide rail 6 with the holding device 5 so as to be particularly stiff and less susceptible to torsion.

At the same time, the U-shaped embodiment of the pivot handle ensures that the pivot handle can dip into the holding device and that the guide rail can dip into the pivot handle, so that the components are located within one another in a space-saving and optically advantageous manner when the sliding window is in closed position.

It goes without saying that the invention is not limited to the embodiment, which is illustrated in the figures in an exemplary manner. The pivot handles can also engage on the inner side on a guide rail and/or on the outer side on the holding device. Likewise, it is possible for the control unit to be provided on the pivot handle and for a control bolt to be provided on the guide rail.

An embodiment, in the case of which the pivot handle 7 is prestressed by means of a prestressing element, so that it either retracts the guide rail into the holding device or pushes the guide rail against the sliding window, is also not illustrated. Such a prestressing element can be placed around the support bolt 8 as a flexible spring, for example, and can be supported by the interlink as well as by the holding device 5 or the guide rail.

Figure 5:
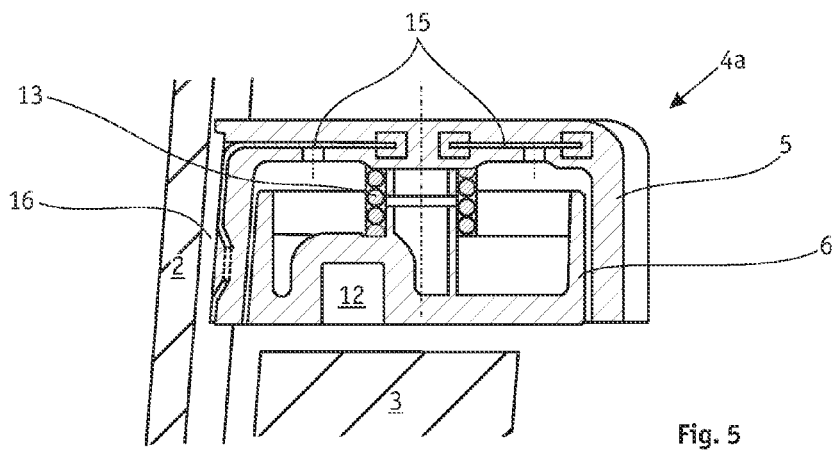
FIG. 5 shows the central area of the guide, which is illustrated in FIG. 1 and FIG. 2, in a sectional view (sectional view according to sectional line C-C from FIG. 1)

FIG. 5 shows a sectional view of the upper guide 4a, which is illustrated in FIG. 1, along the sectional line C-C. A centering pin for a prestressing element in the form of a pressure spring 13 is in each case provided on the guide rail 6 on the upper side and on the holding device 5 on the lower side. Said pressure spring 13 places the guide rail 6 against the sliding window 3, so that the sliding window 3 and the guide rail 6 are in a defined abutment with one another at any time.

Figure 6:
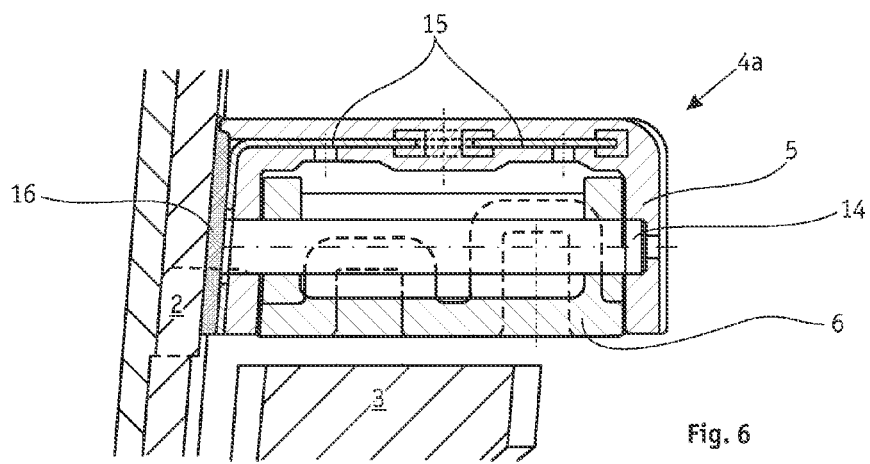
FIG. 6 shows the rear area of the guide, which is illustrated in FIG. 1 and FIG. 2, in a sectional view (sectional view according to sectional line D-D from FIG. 1)

As can be seen from FIG. 5 and FIG. 6 and also from FIG. 1 and FIG. 2, the upper guide 4a is preferably designed such that the guide rail 6 is articulated on the holding device at the front end via the interlink and at the rear end via a pivot bolt 14. Due to the pivot bolt 14, which only allows for a pure pivoting movement of the guide rail, the guide 4a opens in response to the displacement of the sliding window in the manner of scissors. Due to its simplicity and the high stability of the connection between guide rail 6 and holding device, such a pivot bolt is advantageous. However, it is also possible that the guide rail 6 is connected to the holding device at a plurality of locations, in particular at the front and rear end, via a plurality of interlinks, instead of the support via a pivot bolt shown in FIG. 6. This would have the advantage that the guide rail 6 could not only be displaced in a pure pivoting movement about the pivot bolt relative to the holding device, but that it could also and simultaneously as a whole be displaced downwards relative to the holding device. The equalization devices at the sliding window, which will be described below with reference to FIGS. 7a and 7b, would then no longer be necessary.

FIGS. 4 to 6 show that the holding device 5 can be embodied as an elongate and/or U-shaped profile part made of plastic, in which sheet metal inserts 15 are embedded, which ensure additional stability. The holding device is preferably connected to the stationary window pane 2 via an adhesion 16 on the inner side, but can also be arranged on other components, which are fixedly connected to the auto body, or on the auto body itself.

The holding device must not necessarily be extend across the entire length of the guide rail as an elongate profile, as is shown in particular in FIG. 1 and FIG. 2, but can also comprise a plurality of holding devices, which are arranged at a distance to one another. However, the embodiment of the holding device as an elongate profile part, which extends across the entire length of the guide rail, makes it possible for the guide rail to be able to dip into the holding device across its entire length. This is desirable for optical reasons, because the multi-part design of the guide can thus not simply be identified from the outside.

The sliding window interacts with the guide rail in the front as well as in the rear by means of guide elements. Due to the spring force, which the pressure spring 13 exerts on the guide rail 6, the guide rail 6 is placed against the front part of the sliding window and pivots downwards during the opening movement of the sliding window 3. The distance of the guide rail relative to the front part of the sliding window and the guide elements, which are arranged in this area, thus does not change in a functionally considerably manner during the opening movement. Only the angle between guide rail and the upper edge of the sliding window changes slightly, but not to an extent, which impacts the function of the guide elements. However, the distance in the rear part of the sliding window changes considerably, as can be seen from FIG. 1 and FIG. 2.

To be able to ensure that the guide elements interact in a disturbance-free manner with the guide rail in spite of this distance change, they are arranged on the sliding window 3, thus either directly in or on the sliding window pane itself, respectively, or in or on a frame element, respectively, which is connected to the sliding window pane as part of the sliding window 3, and are embodied such that the guide elements are capable of equalizing the distance change.

Figure 7A:
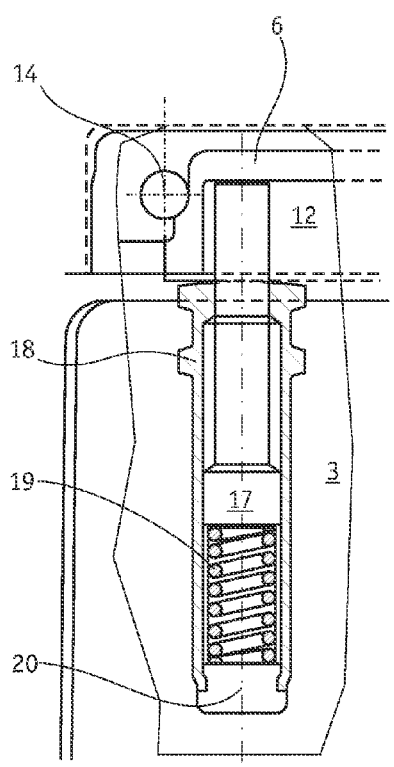
FIG. 7a shows a guide element arranged in the rear area of the sliding window in the closed position of the sliding window.
Figure 7B:
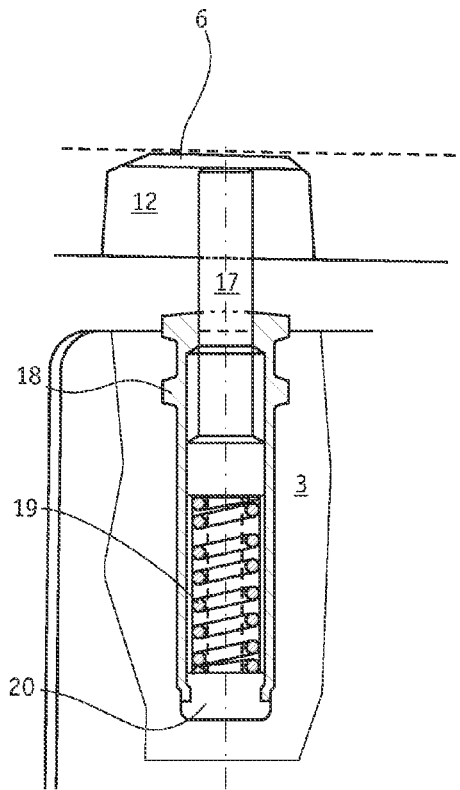
FIG. 7b shows the guide element shown in FIG. 7a in the open position of the sliding window.

As can be seen from FIGS. 7a and 7b, the guide elements are preferably embodied as guide pins 17, which are accommodated in a spring-loaded manner in an accommodation, for example in the form of the sleeve 18, which is illustrated in the figures. While the guide pin 17 in FIG. 7a represents the position in closed position of the sliding window 3, FIG. 7b shows the same guide pin 17 in open position of the sliding window 3, in which the pressure spring 19 relaxes further in the situation shown in FIG. 7a, and the guide pin 17 projects further from the sleeve 18, so as to engage with the guide groove 12 at the same depth in spite of the greater distance to the groove base of the guide groove 12.

The guide pin 17 is preferably a steel pin and the sleeve 18 is preferably a steel sleeve, which is pressed into a locking cap 20 at its lower end after the insertion of the guide pin 17 and of the pressure spring 19 at the lower side.

The sleeve 18 together with the guide pin 17, pressure spring 19 and locking cap 20 is preferably embedded within a plastic part or is injection molded by said plastic part, respectively, which is attached to the sliding window on the inner side, in particular by means of molding. In particular, the plastic part can be formed by a strip, which extends across a part of the periphery of the sliding window, for example along the upper and/or lower sliding window edge. However, it can also be a frame, which extends along the entire periphery of the sliding window.

LIST OF REFERENCE NUMERALS

1 sliding window component
2 stationary window panel
3 movable sliding window
4a upper guide
4b lower guide
5 holding device
6 guide rail
7 pivot handle
8 support bolt
9 control bolt
10 control groove
11 assembly groove
12 guide groove
13 pressure spring
14 pivot bolt
15 sheet metal insert
16 adhesion
17 guide pin
18 sleeve
19 pressure spring
20 locking cap

The invention claimed is:

1. A window assembly for a motor vehicle comprising:
   (i) a stationary window pane;
   (ii) a sliding window pane;
   (iii) a first guide and a second guide;
   (iv) a sliding path;
   wherein the first guide and second guide define the sliding path and guide the sliding window pane in relation to the stationary window pane from an open position to a closed position or from the closed position to the open position along the sliding path,
   wherein the first guide and the second guide are non-parallel with respect to each other when the sliding window pane is in the closed position, and wherein at least one of the first guide and the second guide comprise an equalizing guide,
   wherein the equalizing guide further comprises a guide rail, a holding device, and an equalizing bearing,
   wherein the holding device is fixed relative to the stationary window pane,
   wherein the guide rail is movably connected to the holding device by the equalizing bearing,
   wherein the equalizing bearing allows a compensation for a change in position of the guide rail relative to the holding device caused by a change in position of the sliding window pane in relation to the stationary window pane along the sliding path,
   wherein the guide rail moves in response to the change in position of the sliding window pane in relation to the stationary window pane along the sliding path,
   wherein the equalizing bearing comprises at least one interlink,
   wherein the interlink is articulated on and pivotally movable in relation to the holding device and is articulated on and pivotally movable in relation to the guide rail and is slidably movable at least in relation to the holding device or in relation to the guide rail, and
   wherein the interlink connects the guide rail to the holding device in a stabilizing manner in order to effectively accommodate transverse or torsion forces which may act on the guide rail.

2. The window assembly according to claim 1,
   wherein the interlink is articulated on the holding device and the guide rail such that it is pivotable and not slidable relative to one of the holding device or the guide rail, and that it is both pivotable and slidable relative to the other one of the holding device or the guide rail.

3. The window assembly according to claim 1, wherein the interlink is a pivot handle.

4. The window assembly according to claim 1,
   wherein the interlink is pivotable and not slidable on the holding device and is both pivotable and slidable relative to the guide rail.

5. The window assembly according to claim 1,
   wherein the interlink engages with one of the guide or the holding device, to which it is articulated in a pivotable and slidable manner.

6. The window assembly according to claim 5,
   wherein the interlink engages with the guide rail or the holding device via a control groove and a control bolt.

7. The window assembly according to claim 5,
   further comprising an assembly groove as an assembly aid, wherein the assembly groove precedes the control groove and continues into the control groove in order to allow the control bolt to be transferred into the control groove via the assembly groove.

8. The window assembly according to claim 1,
   wherein the interlink is articulated on the guide rail on both sides of the guide rail.

9. The window assembly according to claim 1,
   wherein, depending on the displacement of the window, the interlink and guide rail are placed into the holding device in the following arrangement:
   (i) the guide rail is placed in and is encompassed by the interlink, and,
   (ii) the interlink is placed in and is encompassed by the holding device.

10. The window assembly according to claim 1,
    wherein a portion of the interlink is U-shaped,
    wherein the interlink comprises two journals, which partially encompass the guide rail.

11. The window assembly according to claim 1,
    wherein the guide rail fits into the holding device such that even at a maximum displacement of the guide rail relative to the holding device, the guide rail remains at least partially placed in and encompassed by the holding device.

12. The window assembly according to claim 11,
    wherein the holding device encompasses the guide rail via a profile journal, and,
    wherein the guide rail dips into the holding device even at a maximum displacement of the guide rail relative to the holding device.

13. The window assembly according to claim 1,
    wherein the guide rail has exterior surfaces and wherein the holding device has interior surfaces, and,
    wherein when the sliding window is in the closed position, the guide rail is at least partially placed in and is encompassed by the holding device such that one or more interior surfaces of the holding device abut one or more exterior surfaces of the guide rail along at least a portion of the guide rail such that the guide rail is held in the holding device and is free from play along the portions in which the exterior surfaces of the guide rail abut the interior surfaces of the holding device.

* * * * *